United States Patent [19]

Enderes et al.

[11] Patent Number: 5,693,888
[45] Date of Patent: Dec. 2, 1997

[54] HEAT CONDUCTANCE VACUUM GAUGE WITH MEASURING CELL, MEASURING INSTRUMENT AND CONNECTING CABLE

[75] Inventors: Rolf Enderes, Stolberg; Anno Schoroth, Konigswinter, both of Germany

[73] Assignee: Leybold Aktiengesellschaft, Hanau, Germany

[21] Appl. No.: 522,279

[22] PCT Filed: Feb. 25, 1994

[86] PCT No.: PCT/EP94/00534

§ 371 Date: Sep. 13, 1995

§ 102(e) Date: Sep. 13, 1995

[87] PCT Pub. No.: WO94/21994

PCT Pub. Date: Sep. 29, 1994

[30] Foreign Application Priority Data

Mar. 17, 1993 [DE] Germany .................... 43 08 433.8

[51] Int. Cl.⁶ .................................................. G01L 9/02
[52] U.S. Cl. ........................................... 73/755; 73/756
[58] Field of Search ............................... 73/755, 756, 766, 73/708; 340/870.39

[56] References Cited

U.S. PATENT DOCUMENTS

| | | |
|---|---|---|
| 2,726,546 | 12/1955 | King, Jr. . |
| 4,373,387 | 2/1983 | Nishimura et al. . |
| 4,492,123 | 1/1985 | Reich .................... 73/755 |
| 4,715,003 | 12/1987 | Keller et al. .......... 73/766 X |
| 4,729,242 | 3/1988 | Reich et al. .......... 73/755 |
| 4,787,251 | 11/1988 | Kolodjski . |
| 4,872,349 | 10/1989 | Espiritu-Santo ...... 73/708 X |
| 4,920,793 | 5/1990 | Djorup . |
| 5,069,066 | 12/1991 | Djorup . |
| 5,135,002 | 8/1992 | Kirchner et al. ..... 73/766 X |

FOREIGN PATENT DOCUMENTS 0202547  11/1986  European Pat. Off. .

Primary Examiner—Michael Brock
Attorney, Agent, or Firm—Harris Beach & Wilcox, LLP

[57] ABSTRACT

The invention relates to a process for operating a controlled heat conductance vacuum gauge with a measuring cell (18) comprising a Wheatstone bridge (1) with supply voltage (12, 13) and measurement voltage terminals (14, 15), a power supply and measuring instrument (21) and a connecting cable (19) containing several conductors and to a circuit therefor; in order to prevent errors of measurement caused by connecting cables (19) of different lengths and to automate cable length equalization it is proposed that the voltage of a power supply terminal (12, 13) of the Wheatstone bridge (1) in the measuring cell (18) be recorded without current via one (26) of the conductors of the connecting cable (19) and taken into account in the formation of the measurement value.

10 Claims, 3 Drawing Sheets

HEAT CONDUCTANCE VACUUM GAUGE WITH MEASURING CELL, MEASURING INSTRUMENT AND CONNECTING CABLE

BACKGROUND OF THE INVENTION

The invention relates to a process for operating a controlled heat conductance vacuum gauge with a measuring cell comprising a Wheatstone bridge with supply voltage and measurement voltage terminals, a power supply and measuring instrument and a connecting cable containing several conductors. Moreover, the invention relates to circuits suitable for implementation of this process.

Heat conductance vacuum gauges utilise the effect, that from a temperature-dependant resistance element more heat is lost at high gas pressures, i.e. at higher particle densities, compared to lower gas pressures. In the heat conductance vacuum gauge after Pirani, the temperature-dependant resistance element is a gauge filament which is part of a Wheatstone bridge. In the uncontrolled Pirani vacuum gauge, a change in the resistance of the gauge filament unbalances the bridge whereby this imbalance is taken as a measure for the pressure. In the controlled Pirani gauge, the supply voltage which is applied to the bridge is continuously controlled in such a manner that the resistance and thus the temperature of the gauge filament remains constant, irrespectively of the heat loss. The current required to maintain the resistance value at a constant level is a measure for the heat conduction and thus for the pressure of the gas. Commonly, the Wheatstone bridge is aligned for minimum imbalance by readjusting the supply voltage applied to the bridge accordingly. The bridge supply voltage thus represents the primary electrical quantity which corresponds to the pressure.

In heat conductivity gauges there is often the necessity to separate the locations of the measuring cell and the measuring instrument. For this it is required to connect measuring cell and measuring instrument by a cable of suitable length. In the case of longer cables, the conductors which are part of the cable and which generally have the same electrical properties, have resistances which can no longer be neglected. Therefore, the voltage which is generated in the measuring instrument and which is employed as the supply voltage to balance the bridge and which is also used as the measurement value, does no longer correspond to the true bridge supply voltage because of the voltage drop across the conductors of the connecting cable. From this there results a measurement error which increases with the length of the connecting cable. Temperature and thus resistance changes in the conductors of the connecting cable are the cause for further measurement errors.

SUMMARY OF THE INVENTION

In heat conductivity vacuum gauges according to the state-of-the-art, the length of the cable is accounted for by way of a manual alignment after having established the connection between the measuring cell and the measuring instrument. For this either a voltage which is proportional to the bridge supply voltage and the cable length or—in the case of microprocessor controlled instruments—the cable length itself, is entered. The entered values are then taken into account in the formation of the measured pressure value. A cable length alignment process of this kind must be repeated—manually—each time the cable is exchanged. The measurement errors which are caused by temperature-dependant changes in the resistance of the connecting cable and the bridge or which are caused by the operating conditions, remain unaccounted for here.

The present invention is based on the task of avoiding said measurement errors and moreover to automate the cable length alignment process.

According to the invention this task is solved by a process of the aforementioned kind so that the voltage of one of the supply voltage terminals of the Wheatstone bridge located in the measuring cell is recorded without current via one of the conductors of the connecting cable and by taking this into account in the formation of the measurement value. Recording the voltage of one of the two voltage terminals without current permits the calculation of the resistance of a conductor in the connecting cable or at least the formation of a voltage $U_L$ which corresponds to the resistance of the conductor in the connecting cable. According to the equation $$U_{Br} = U'_{Br} - 2 \times U_L \qquad (\text{Eq. 1})$$

it is possible to determine the true bridge supply voltage $U_{Br}$ from $U'_{Br}$ (bridge supply voltage generated in the measuring instrument) and $U_L$. If the measured values are formed with the aid of a microprocessor or a suitable analogue circuit, for example, the value $U_L$ may be accounted for continuously in the formation of the measurement values in accordance with the given equation. Resistance changes in the conductors owing to an exchanged connecting cable or due to temperature changes are accounted for automatically. Special manual measures are no longer required.

Further advantages and details of the present invention shall be explained on the basis of the design examples of drawing FIGS. 1 to 6.

DESCRIPTION OF THE INVENTION

Figure 1:
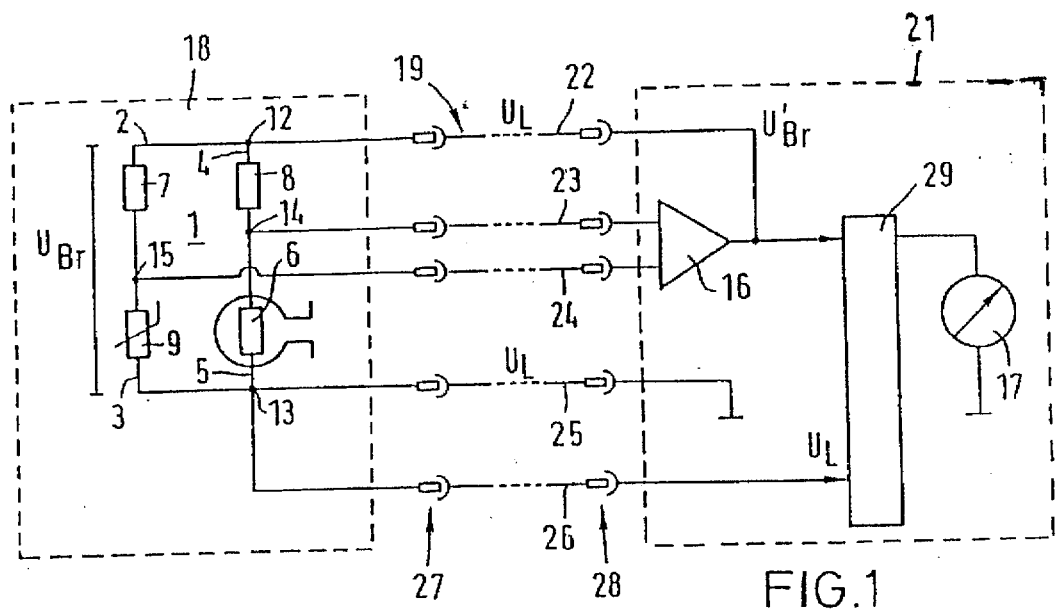
FIG. 1 is a schematic diagram of a circuit for implementing a process according to an embodiment of the present invention.

The circuit shown in drawing FIG. 1 comprises Wheatstone bridge 1 with its branches 2 to 5. Placed in these branches are gauge filament 6 and resistances 7 to 9. Between the branches there are located terminals 12 to 15, whereby terminals 12, 13 form the supply diagonal and terminals 14, 15 the measurement diagonal. The controlled supply voltage $U_{Br}$ is applied to terminals 12 and 13, whereby terminal 13 is at ground potential. Terminals 14, 15 of the measurement diagonal are connected to the amplifier 16, through which the supply voltage is controlled continuously in such a manner that the resistance of the gauge filament (and thus its temperature) is kept constant, irrespectively of the heat loss. Display unit 17 is provided to display in a known manner the pressure which corresponds to the supply voltage.

Resistance 9 is temperature dependent in a manner which is basically known. Thus it is possible to compensate interfering temperature influences of gauge filament 6.

The Wheatstone bridge 1 with its gauge filament 6 which is arranged in a suitable housing form the pressure sensor or the measuring cell 18. The further components (supply, processing, display 17 etc.) of which not all are shown, are part of a measuring instrument 21 which is linked by a multi-core cable 19 to the measuring cell 18. Cable 19 comprises connecting conductors 22 to 26 and is releaseably connected via connectors 27, 28 to the sensor and the measuring instrument 21 respectively. Connecting conductors 23, 24 link terminals 14, 15 of the measurement diagonal to the amplifier 16. When bridge 1 is unbalanced, the supply voltage $U_{Br}$ is readjusted in such a manner that the bridge is balanced again. Connecting conductors 22, 25 serve the purpose of supplying the bridge 1 with power. Bridge supply current I flows through these. In the case of longer connecting cables the resistance of the connecting conductors can no longer be neglected. Therefore, the voltage $U_L$ drops across these conductors. The voltage $U_{Br}$ which is truly dropped across bridge 1 does thus not correspond to the bridge voltage $U'_{Br}$ generated in the measuring instrument 21. The relationship between $U_{Br}$, $U'_{Br}$ and $U_L$ applies as detailed above (Eq. 1).

In the design example according to drawing FIG. 1 there is present a further connecting conductor 26 which is identical to the other connecting conductors 22 to 25 and which connects the supply voltage terminal 13 to the measuring instrument 21. The supply voltage terminal 13 is not at ground potential because of the voltage $U_L$ which drops across conductor 25. The voltage at 13 is recorded or measured without a current via conductor 26. A microprocessor or an analogue circuit is marked by 29, in which the measurement data are processed. The voltage $U_L$ is entered as a correction value. The microprocessor or the analogue circuit takes $U_L$ into account according to equation 1 so that the true bridge supply voltage $U_{Br}$ is displayed instead of the bridge supply voltage $U'_{Br}$ generated in the measuring instrument.

$U_L$ may also be determined by measuring—without current—the voltage at supply voltage terminal 12. $U_L$ then results from the difference between the voltage measured at 12 and the supply voltage $U'_{Br}$ generated in the measuring instrument.

Figure 2:
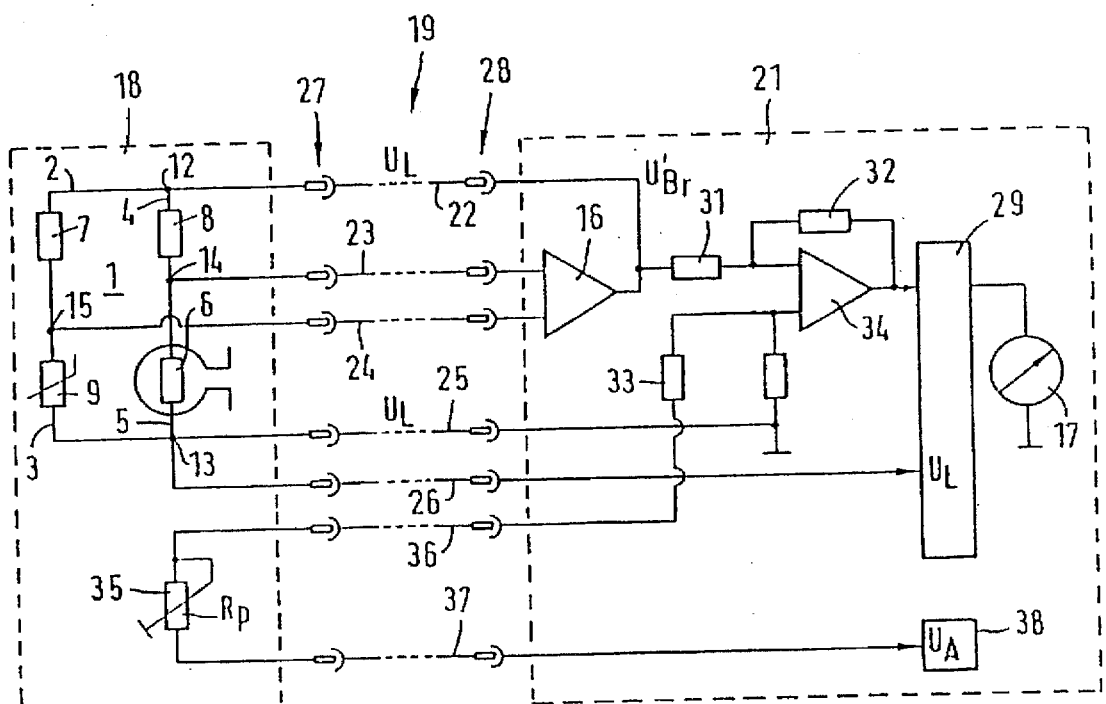
FIG. 2 is a schematic diagram of a circuit for implementing a process according to an embodiment of the present invention.

In the circuit according the drawing FIG. 2 further components are provided which permit a Zero level correction of gauge filament 6. These components comprise an amplifier—composed of resistances 31, 32, 33 and amplifier 34—which are located in measuring instrument 21 and which are inserted between controller 16 and the microprocessor 29, as well as an adjustable resistance 35 $R_p$ which is located in sensor 18. One side of resistance 35 is connected via conductor 36 to the amplifier. The other side of resistance 35 is connected via conductor 37 to an alignment voltage $U_A$ (component 38 in the measuring instrument). The Zero level is adjusted in such a manner that resistance 35 is adjusted until at 0 pressure the value 0 is displayed. The adjusted correction voltage is transmitted via conductor 36 to the measuring instrument and superimposed on the measured value with the aid of the controller.

Figure 3:
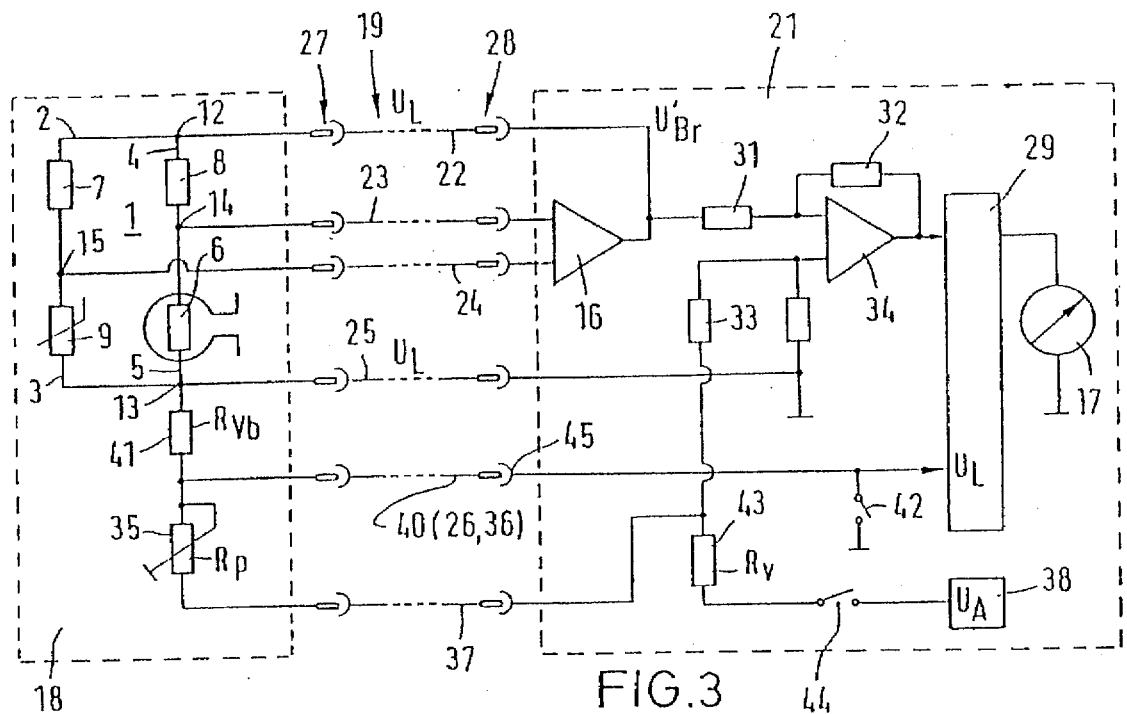
FIG. 3 is a schematic diagram of a circuit for implementing a process according to an embodiment of the present invention.

The circuit according the drawing FIG. 3 corresponds to the circuit of drawing FIG. 2. However, the conductor resistance alignment and Zero correction facilities have been combined in such a way that one connecting conductor has been dropped, i.e. one of the connecting conductors can be utilised for two purposes. For this, supply voltage terminal 13 is connected via resistance 41 ($R_{vb}$) to resistance 35. Conductors 26, 36 are combined to one conductor 40. Moreover, switch 42 is provided through which the common conductor 40 (26, 36) can be connected to ground potential on the side of the measuring instrument. Finally, resistance 43 ($R_v$) and a switch 44 are located between conductor 37 and the component 38 which serves the purpose of generating the alignment voltage $U_A$.

Switch 42 must be open for measurement of the voltage drop across the supply conductors. The supply voltage of the bridge flows via conductor 25 to the ground of the instrument. Supply voltage terminal 13 is linked to the measuring instrument 21 via resistance 41 and conductor 40, so that is possible to measure—without current—on the side of the instrument a voltage which is equal or proportional to the voltage drop across the ground conductor. Here a difference has to be made between two cases:

a) When switches 42 and 44 are open, the voltage measured at 45 (point on conductor 40 on the side of the measuring instrument) is equal to the voltage drop $U_L$ across the ground conductor.

b) When switch 42 is open and switch 44 is closed, the voltage at 45 depends on the voltage drop across the ground conductor and the voltage drop across resistance 41 due to the setting of the potentiometer 35 for the Zero alignment. In this case resistance 35 must be calculated first. This resistance can be calculated with sufficient accuracy according to the following equation, when both switches 42 and 44 are closed:

$$\frac{U_{RP}}{U_A} = \frac{U_0}{U_A} = \frac{R_p}{R_v + R_p} \qquad \text{(Eq. 2)}$$

($U_0$ = Zero voltage)

Here it is assumed that $R_v + R_{vb} \gg L_R$) (Resistance of the conductors).

$R_p$ can be calculated from equation 2. Since resistance $R_p$ is now known, the voltage can be calculated due to the voltage drop across the ground conductor.

$$U_L = U_{(at\ 45)} - U_A/(R_v + R_p + R_{vb}) \times R_{vb}.$$

After the voltage drop across the ground conductor is known, the bridge voltage $U_{Br}$ can be calculated from equation 1.

During the Zero alignment measurement, switch 44 must be closed. Switch 42 may be open or closed. If it is closed and after applying the voltage $U_A$ and depending on the setting of resistance 35, then conductor 37 carries a voltage which is proportional to the 'Zero voltage' $U_0$. This voltage level is applied to the adder with the amplifier 34 or—cf. drawing FIG. 5—applied to a software which takes account of the Zero voltage during processing of the measurement values. If switch 42 is open, the voltage drop across $R_{vb}$ must be taken into account in the calculation of the voltage $U_0$.

Resistance 41 as the link between terminal 13 and resistance 35 is necessary if measuring cells 18 designed according to the present invention are to be compatible with measuring instruments 21 already on the market. In the case of adapted measuring instruments the link between terminal 13 and resistance 35 can also be a short-circuit. In this case switch 44 must be closed during the Zero alignment process. The setting of switch 42 is irrelevant.

Figure 4:
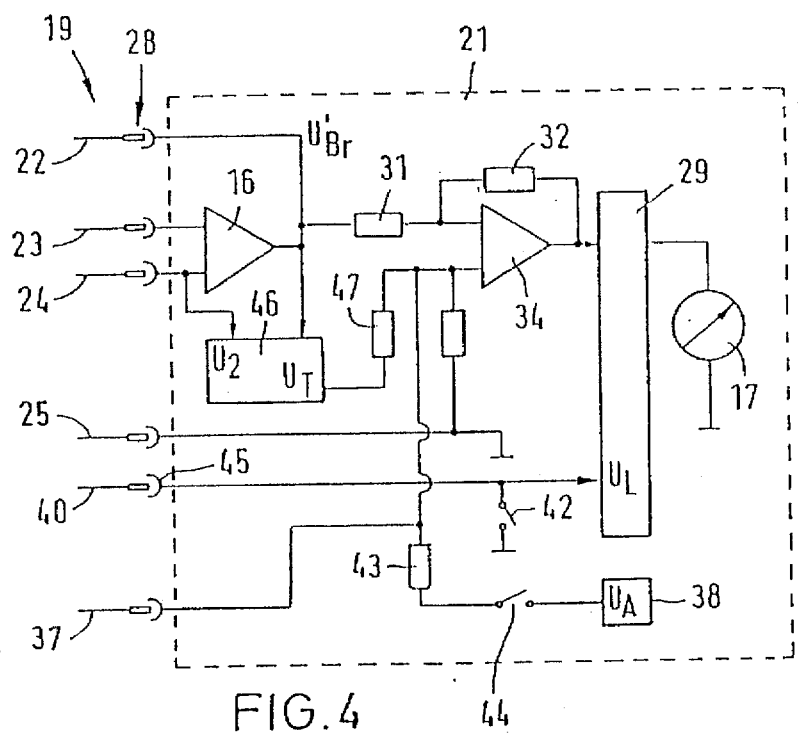
FIG. 4 is a schematic diagram of a circuit for implementing a process according to an embodiment of the present invention.

Shown in drawing FIG. 4 is a design version for the measuring instrument 21 which substantially corresponds to the design according to drawing FIG. 3. Additionally a temperature compensation arrangement is provided comprising of building block 46 and resistance 47. The voltage $U'_{Br}$ and the voltage $U_2$ (voltage drop across resistance 9) of measurement diagonal terminal 15 is applied to building block 46. From these values a voltage $U_T$ is formed in building block 46 which corresponds to the value of the temperature-dependant resistance 9, and this according to the equation $$U_T = \frac{U_2}{U_{Br} - U_2} \times k \quad k = \text{proportional factor}$$

Thus there exists the possibility of continuously generating correction signals, which account for the temperature dependency and can for this reason be utilised for the formation of precise measurement values, by applying these via resistance 47 to the controller with the amplifier 34.

Figure 5:
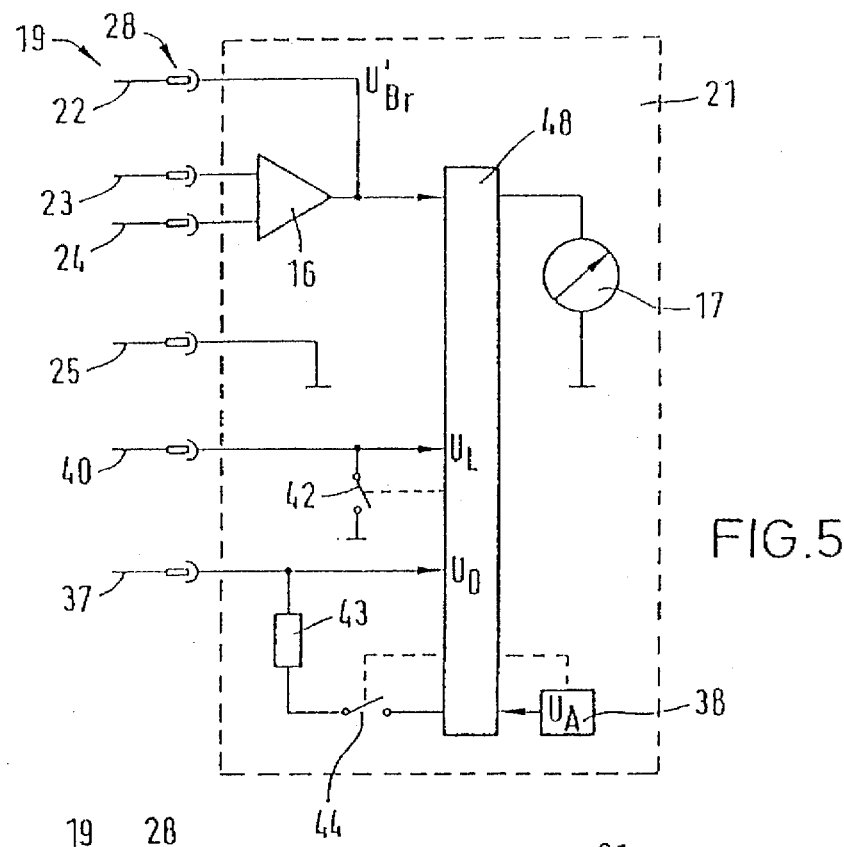
FIG. 5 is a schematic diagram of a circuit for implementing a process according to an embodiment of the present invention.
Figure 6:
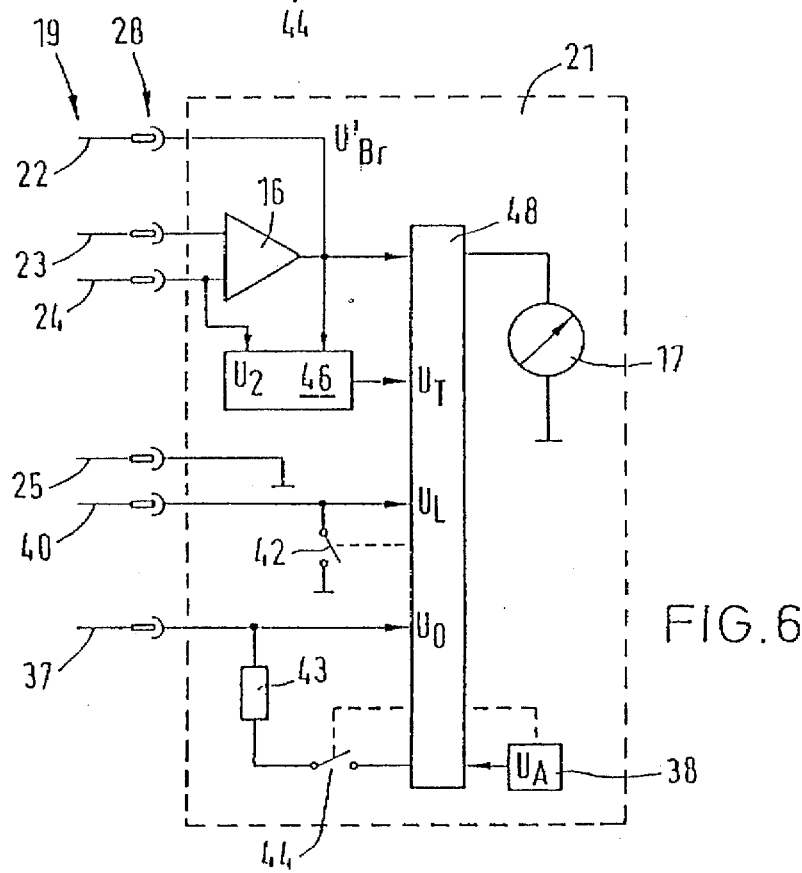
FIG. 6 is a schematic diagram of a circuit for implementing a process according to an embodiment of the present invention.

In the design examples according to drawing FIGS. 5 and 6, a computer building block 48 is provided which serves the purpose of processing the measurement values in consideration of the corrective values $U_L$, $U_O$ and $U_2$ (drawing FIG. 6 only). Additionally, building block 48 has controlling functions in that it initiates the Zero alignment process and the conductor resistance alignment process at the desired time intervals. The broken line indicates that building block 48 initiates opening and closing of switches 42, 44 formed by transistors, and that the alignment voltage $U_A$ is applied. The pressure measurements performed with the instrument described are substantially free of measurement errors over the entire measurement range and this in spite of changing cable lengths and—if a temperature compensation arrangement of the kind described is provided—interfering temperature influences on the gauge filament.

What is claimed is:

1. Process for operating a controlled heat conductance vacuum gauge with a measuring cell (18), comprising a Wheatstone bridge (1) with supply voltage (12, 13) and measurement voltage terminals (14, 15), a power supply and measuring instrument (21) and a connecting cable (19) containing several conductors, wherein the voltage from one supply voltage terminal (12, 13) of the Wheatstone bridge (1) in the measuring cell (18) is recorded without current via one of the conductors (26) of connecting cable (19) and taken into account in the formation of a measured value.

2. Process according to claim 1, wherein a Zero level correction is implemented via two further conductors (36, 37), by supplying a variable resistance (35) in the measuring cell via the two further conductors (36, 37) on the one hand with an alignment voltage $U_A$ and on the other hand by connecting it to the input of a measurement signal amplifier (34) whereby said variable resistance is adjusted until at 0 pressure a 0 value is indicated.

3. Process according to claim 2, wherein the conductor (26) of connecting cable (19) which serves the purpose of measuring—without current—the voltage at one of the supply voltage terminals (12, 13) is also used for the purpose of Zero level correction.

4. Process according to claim 2, wherein the value or the temperature of a temperature-dependant resistance (9) which is part of the measurement bridge (1), is determined and that a corresponding signal is taken into account as a temperature-dependant correction signal in the formation of the measured values.

5. Process according to claim 1, wherein a plurality of signals for cable length alignment, for Zero level correction and/or temperature compensation are applied to the input of a measurement signal amplifier (34) or a computer building block (48) for the purpose of signal processing.

6. Circuit for operating a controlled heat conductance vacuum gauge, comprising:

a Wheatstone bridge (1) including first and second terminals (12, 13) for receiving a supply voltage and third and fourth terminals (14, 15) for measuring a measured voltage;

a measuring instrument (21);

a cable including first, second, third, and fourth conductors (22 to 25) which supply the bridge (1) and which transfer a measurement signal, releasably connecting said first, second, third, and fourth terminals (12–15) of said Wheatstone bridge (1) to said measuring instrument (21); and a fifth conductor (26) in said cable connected to said second terminal (13) of said Wheatstone bridge (1), wherein said measuring instrument records a voltage from said second terminal (13), without current, via said fifth conductor (26), and takes said recorded voltage into account when determining a true voltage from said measured voltage.

7. Circuit according to claim 6, further comprising sixth and seventh conductors (37, 40) which serve the purpose of transferring a plurality of Zero level alignment signals as well as a plurality of cable length alignment signals.

8. Circuit according to claim 7, further comprising two switches (42, 44) on a side of the measuring instrument are assigned to sixth and seventh conductors (37, 40) whereby said switches are employed to set up a plurality of states which permit either a Zero level correction or a cable length alignment.

9. Circuit according to claim 6, further comprising means (46, 47) for avoiding measurement errors owing to temperature fluctuations in an area of a measuring cell (18).

10. Circuit according to claim 9, further comprising one of a measurement signal amplifier (34) and a computer building block (48), to which a plurality of signals which serve the purpose of cable length, Zero level correction, and/or temperature compensation are applied.

* * * * *